United States Patent [19]

Edwards

[11] Patent Number: 4,516,907
[45] Date of Patent: May 14, 1985

[54] WIND ENERGY CONVERTER UTILIZING VORTEX AUGMENTATION

[76] Inventor: Samuel S. Edwards, 17401 Marilia St., Northridge, Calif. 91325

[21] Appl. No.: 475,219

[22] Filed: Mar. 14, 1983

[51] Int. Cl.³ ............................................. F03D 1/02
[52] U.S. Cl. ...................................... 415/2 A; 415/4; 415/DIG. 1
[58] Field of Search .............................. 415/2 A-4 A, 415/DIG. 1

[56] References Cited

U.S. PATENT DOCUMENTS

| | | | |
|---|---|---|---|
| 2,517,135 | 8/1950 | Rudisill | 416/9 X |
| 4,045,144 | 8/1977 | Loth | 415/2 A X |
| 4,047,832 | 9/1977 | Sforza | 415/2 A X |
| 4,084,918 | 4/1978 | Pavlecka | 415/2 R X |
| 4,204,799 | 5/1980 | de Geus | 415/3 A X |
| 4,324,985 | 4/1982 | Oman | 415/4 A X |
| 4,398,096 | 8/1983 | Faurholtz | 415/2 R X |
| 4,422,820 | 12/1983 | Kirsch et al. | 415/4 A |

FOREIGN PATENT DOCUMENTS

| | | | |
|---|---|---|---|
| 595497 | 4/1934 | Fed. Rep. of Germany | 416/9 |
| 3122663 | 3/1982 | Fed. Rep. of Germany | 416/9 |
| 516675 | 4/1921 | France | 416/9 |
| 866053 | 6/1941 | France | 415/DIG. 1 A |
| 2283331 | 3/1976 | France | 416/DIG. 6 |
| 1508752 | 4/1978 | United Kingdom | 415/DIG. 1 A |

Primary Examiner—Everette A. Powell, Jr.
Attorney, Agent, or Firm—Roger A. Marrs

[57] ABSTRACT

A wind energy conversion apparatus is disclosed herein for converting the linear momentum of wind energy into a pair of concentrated, counter-rotating and side-by-side regions of high angular momentum which includes a wing having variable angle of attack positionable forward of the entrance to an elongated duct having a bell mouth including an upper, inner reflex angular surface leading into a bifurcated duct section terminating in a diffuser augmenter at the aft facing area of the duct and which includes propellors operable to extract energy from the angular momentum in the established regions for driving electric generators or generator therefrom.

6 Claims, 7 Drawing Figures

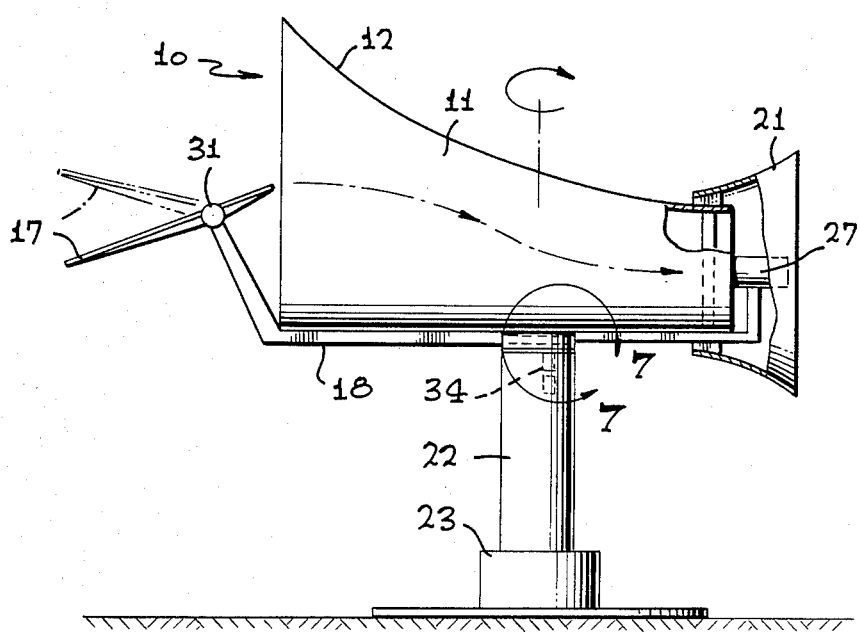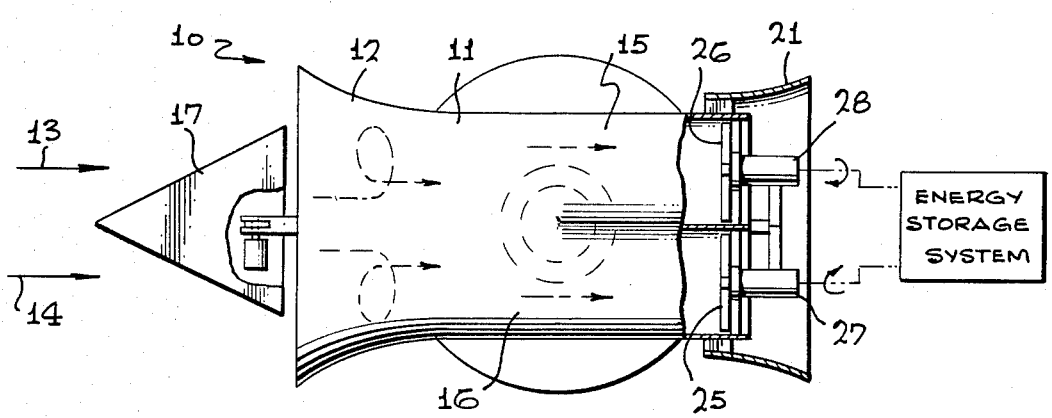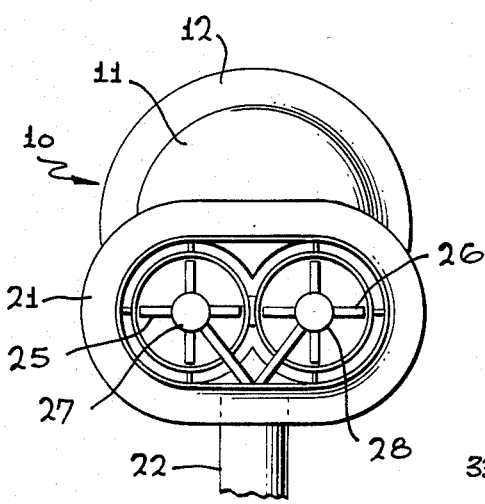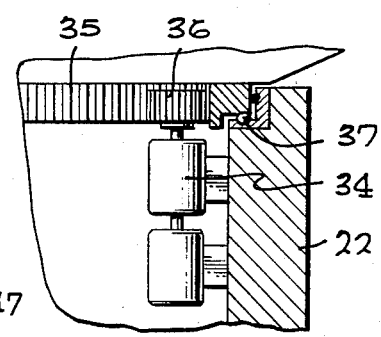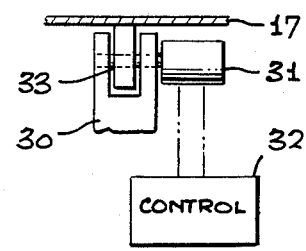

WIND ENERGY CONVERTER UTILIZING VORTEX AUGMENTATION

BACKGROUND OF THE INVENTION

1. Field of the Invention

This invention relates to wind energy conversion devices and more particularly to a novel such device employing vortex type kinetic energy concentration by controllably coordinating adjacent swirls of counter-rotating vortex regions for driving energy extracting propellors thereby performing useful work.

2. Brief Description of the Prior Art

Man's improved technology has wrought tremendous advances in many fields and, in particular, the science of energy conversion influences almost every field of human activity. The wide and varied uses of wind energy as a renewable source forms an integral, essential component of power sources and instruments and the very heart of most devices such as windmills utilized as a power source or generator.

Although energy conversion of ambient wind is one of the oldest forces known to man, only recently have efforts been made to harness the natural forces of wind energy in the form of a practical and efficient power source. Generally, these sources are being designed and fabricated by conventional methods and to standards which have been in use for many years. These designs and methods usually involve the conversion of wind energy into mechanical work by employing such elements as windmills or the like utilizing impingement of wind against propellors, sails and other mechanical means.

Wind energy has for many years been employed in agricultural devices such as water pumps; however, these wind devices generally are unsuitable for developing sufficient power to operate under conditions requiring a substantial loading of the power source such as may be used for a wide variety of high energy tasks as in hydrodynamic pumping, power generation and other mechanical and hydraulic apparatus when the power source is heavily loaded at all times.

Improvement in primary power sources incorporating natural wind forces which are permitted by modern technological approaches and conceptual improvement can greatly reduce the cost of such primary power sources and make the power source more durable, long lived and more compact by effecting the controlled collection and concentration of the natural wind energy so that a significant change in unsteady forces results whereby major mechanical energy extraction can be effected.

In the past, a number of devices have been made to effect a controlled usage of wind power employing the extraction of energy from a renewable wind source involving the direct impingement of wind against a horizontal or vertical axis windmill. This direct approach in the megawatt power regime requires propellor diameters which are extremely large and, as such, encounter significant oscillating centrifugal and gravity loads when exceptionally large windmills are employed. These loads have a large impact upon the safety, cost, and fatigue life of conventional windmills of large size.

These factors generally limit the top wind speed at which the device can be operated and above which the device must be shut down. Moreover, the huge gyro movement that must be overcome to swing the propellor plane into the wind is a major design factor.

In some recent instances, vortex augmentation has been coupled to turbine generators by employing a variety of diffuser shrouds, divergent ducts and wing configurations for forming twin vortices. Kinetic energy is captured from the vortices for driving the turbines. When conventional "S" ducts are employed (such as in aircraft power-plant air intakes), the airflow does not stay parallel to the duct centerline, but becomes highly angular and creates counter-rotating regions of high angular momentum. Unequal pressure distribution on the engine fan and undesirable and unexpected net lifting forces on the aft end of the engine duct supporting structure occur. In studying this phenomena, however, one begins to realize that in the conversion from linear momentum to angular momentum, energy conversion factors also are involved. In probable recognition of this point, a prior wind converter employing a delta wing configuration for producing a rolled-up vortex region immediately ahead of fan blades or rotors has been described; however, the position of the rotors is too close to benefit sufficiently from vortex roll-up (among other factors (loss of downwash) also tending to diminish effectiveness).

Accordingly, a long standing need has existed to provide a new approach to the utilization of wind energy as a renewable source. Such a new conceptual approach would employ vortex-type kinetic energy concentration so that for the same power applied, propellor diameters would be permitted to be smaller by a factor of at least two with an accompanying savings in cost, complexity, noise, electromagnetic interference, and associated fatigue-life factors.

SUMMARY OF THE INVENTION

The above problems and difficulties are obviated by the present invention which employs apparatus specifically in the field of wind energy based upon a concept to convert a linear momentum of wind energy into two concentrated, counter-rotating regions of high angular momentum. The apparatus includes an elongated duct having a reflex angular configuration in side elevational view having an entrance defined as a bell mouth opening leading into a bifurcated duct which performs as an angular momentum guide, vorticity augmenter, and angular momentum modulator. A wing means having a variable angle of attack is operably carried at the entrance of the duct leading into the bell mouth thereof and a diffuser augmenter is provided at the aft end of the bifurcated duct section which lowers the pressure across the aft facing area and augments the flow gradients down the prime duct.

Propellor means are mounted at the exhaust of the bifurcated duct section for extracting energy from the angular momentum and such means is employed for driving electrical generating means therefrom.

Therefore, it is among the primary objects of the present invention to provide a novel wind energy conversion apparatus having essentially zero gyro momentum and which converts the linear momentum of the wind energy into a pair of adjacent counter-rotating regions of high energy, angular, swirling momentum which serves as a prime mover for special propellors adapted to extract energy from the angular momentum.

Another object of the present invention is to provide a wind conversion apparatus which maintains air flow through an angular airflow conducting duct that converts the upwash from the forward wing into angular momentum regions that augment the direct vortex roll-up regions of the wing and which modulates the resulting angular momentum in accordance with the law of conservation of angular momentum.

Still a further object of the present invention is to provide a wind energy conversion apparatus embodying a wing (with variable angle of attack capability) at the entrance of a duct wherein the duct performs as a vortex guide, vorticity augmenter and vortex angular-momentum modulator exhausting via a diffuser augmenter which lowers the pressure across the aft facing area and augments the flow gradients through the duct for direct impingement against propellors driving a load, such as electrical generators.

Yet another object of the present invention is to provide a novel wind converter combining the concept of vortex augmentation with diffuser augmentation by means of an angular momentum modulation duct.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 3 is a side elevational view of the wind conversion apparatus, partially in section and broken away illustration so as to expose internal components;

FIG. 4 is a top view of the apparatus shown in FIG. 3;

FIG. 5 is a fragmentary view of the means employed in the apparatus of FIG. 4 operable to vary the angle of attack of the triangular wing;

FIG. 6 is a rear elevational view of the wind conversion apparatus; and

FIG. 7 is a fragmentary view of the component for directionally orientating the apparatus with respect to oncoming wind energy as taken in the direction of arrow 7—7 in FIG. 3.

DESCRIPTION OF PREFERRED EMBODIMENT

Figure 1:
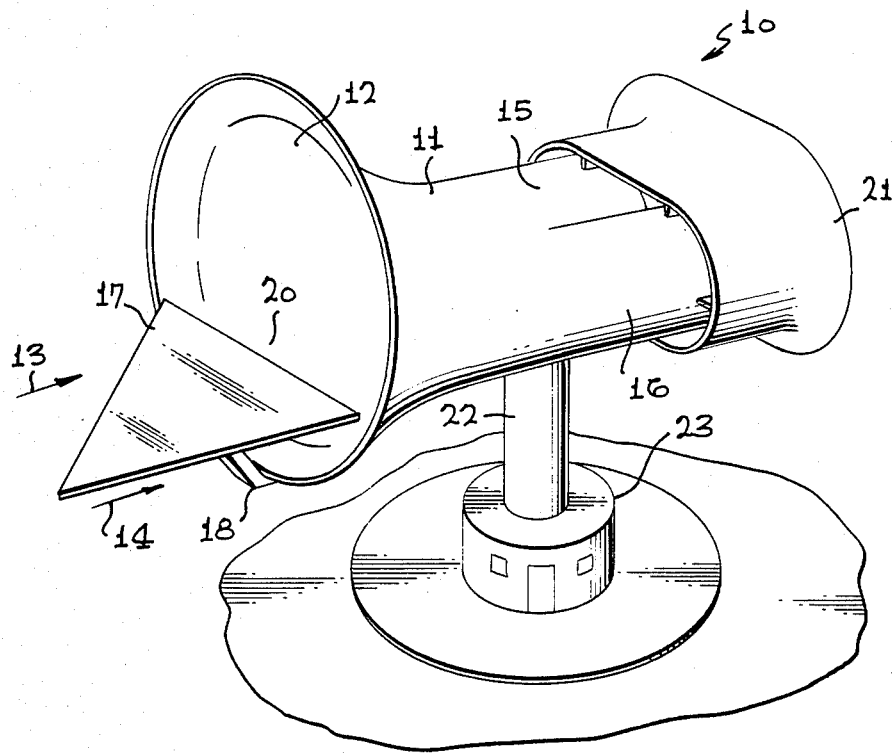
FIG. 1 is a front perspective view of the novel wind conversion apparatus of the present invention.

Referring to FIG. 1, the novel wind energy converter of the present invention is illustrated in the general direction of arrow 10 which includes an elongated duct 11 having a bellmouth chamber 12 receiving onrushing wind as indicated by the arrows 13 and 14 respectively. The bellmouth chamber 12 communicates with a bifurcated aft portion represented by sections 15 and 16 respectively. The bifurcated duct leading to sections 15 and 16 serve as an angular momentum guide for the air as well as a vorticity augmenter and an angular momentum modulator. The entrance to the bell mouth chamber 12 is provided with a wing 17 supported from a keel whereby the wing is provided with variable angle of attack capability. The wing is preferably of a delta configuration as an example having the apex of the triangle forward of the bellmouth and a trailing edge 20 substantially lying across the entrance to the bellmouth chamber. A diffuser augmenter may be employed at the exit or exhaust end of the duct 11 adjacent termination of the bifurcated duct sections 15 and 16 which is employed for lowering the pressure across the aft facing area and which augments the flow gradients down the duct.

Lateral positioning of the apparatus and the duct 11 in particular to wind direction changes is achieved by rotatably mounting the duct on a stanchion or pillar 22. Also, a control house 23 is provided which encloses necessary controls, indicators and monitoring equipment.

Figure 2:
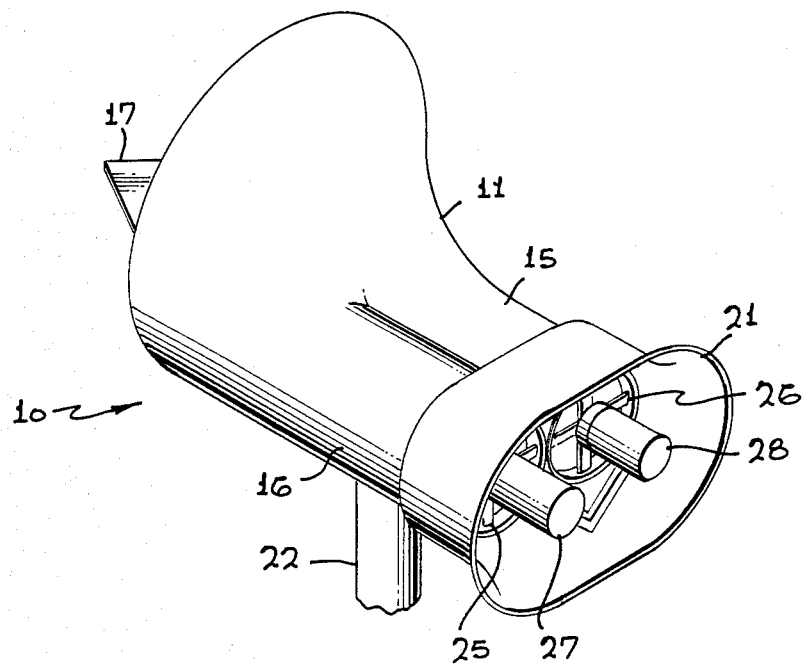
FIG. 2 is a rear perspective view thereof.

Referring now in detail to FIG. 2, it can be seen that the diffuser augmenter 21 includes a flared exit 24 and that the terminating end of the tube or duct sections 15 or 16 house vortex propellors 25 and 26 for effecting energy from the angular momentum as a means for driving a single or dual electric generators 27 and 28.

Referring now in detail to FIGS. 3 and 4, it can be seen that the wind energy enters the large bellmouth area or chamber 12 wherein the linear momentum of wind energy is converted into two concentrated, counter-rotating regions of high angular momentum. Each of the naturally separated regions is physically separated at the marginal mid-section of duct 11 defined by an angle greater than a straight angle (reflex angle) where the bellmouth chamber 12 meets with the bifurcated duct sections 15 and 16. The swept wing 17 generated vortices (at angle of attack) is augmented by mounting the wing at the mouth of the duct 11. The downward plunge of this duct along the curved reflex angle of the upper, inner wall surface further creates vorticity in the same rotational direction as those from the wing and the classical internal aerodynamic flow concentrates the flows into two regions of counter-rotating vorticity. Bifurcation of the circular cross section of the duct 11 into a figure-8 sections 15 and 16 further augments this concentration in accordance with classical angular momentum conservation laws and provides a means of using the known propulsion efficiency advantage of shrouded propellors which are indicated by numerals 25 and 26. If the diffuser augmenter 21 is employed, it lowers the pressure across its aft facing area and augments the pressure drop capability of the device.

Prior uses of a delta wing have had disadvantages for example, the vortices are not fully rolled up; the wing downwash is essentially discarded and turbine tip loss is unavoidable. However, by combining the swept wing with the duct 11 and augmenter 21, a device is provided which combines the proven results of vortex roll up associated with delta wings and utilizes proven advantages of a diffuser augmenter. Also, the inherent vortex generation and vortex guide aerodynamics of the marked reflex angular duct is utilized while bifurcation of the circular duct inlet into a figure 8 cross section duct concentrates and balances the counter-rotating vorticity and provides the added benefit of shrouded propellors. Also, the smaller cross sectional duct area at the propellor section relative to the bellmouth cross section area tightens up the vortex pattern because of the conservation of angular momentum.

The swept wing 17 is pivoted on the end of an arm 30 outwardly projecting from a fixed keel 18. The wing 17 is moved to vary the angle of attack with respect to the approaching wind by means of a motor drive, as shown in FIG. 5, which is indicated by numeral 31 under the selection of controls 32 provided on a panel in the control and monitoring house 23. Gearing 33 couples the drive shaft of the motor 31 with the wing 17 so that the wing may be moved to a selected position (in accordance with wind conditions).

Orientation of the wind energy converter 10 is readily achieved with respect to the wind direction by means of a motor control as illustrated in FIG. 7. The motor is indicated by numeral 34 which is fixedly carried on the post or tower structure 22 and connection is made with the keel 18 or duct 11 by means of a ring gear 35 and a pinion gear 36. Suitable bearing mounts 37 are arranged for rotatably mounting the ring gear on the tower structure 22. In general, because of the size of the generating system envisioned, positioning of the converter 10 relative to wind direction is intended to be power controlled. The device is automatically sensitive to wind directions that are away from the plane of symmetry by angles of the order of 45 degrees or more. Within this region plus or minus 45 degrees, the device should be inherently self compensating in balancing the counter-rotating vorticity by virtue of the duct bifurcation into the figure 8 cross sectional duct sections 15 and 16.

The vortex propellors are more clearly shown in FIGS. 4 and 6 as indicated by numerals 25 and 26. The propellors are specially designed to extract energy from a vortex. All of the usual parameters in propellor design must be considered including: highly angular flow as opposed to uniform flow, number of blades, solidity, plan form, twist, shrouding, camber, pitch (fixed or variable), etc. However, propellor size relatively is not a critical a factor as in large windmill designs.

In view of the foregoing, it can be seen that the novel wind energy converter of the present invention provides a novel means for effectively combining the proven results of a vortex roll-up associated with swept wings and which utilizes the proven advantages of a diffuser augmenter while employing the inherent vortex generation and vortex guide aerodynamics of an S-shaped duct. By employing the bifurcation of the circular S-shaped duct inlet into a figure-8 cross section, the energy is concentrated and balances the counter-rotating vorticity. Added benefits are derived from the employment of shrouded propellors.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a wind energy conversion apparatus for converting the linear momentum of approaching wind energy into regions of high angular momentum comprising the combination of:
   an elongated duct having an inlet bellmouth chamber at one end in fluid communication with a bifurcated mid-section leading into a pair of circular duct portions constituting an exit or exhaust for said duct;
   propellor means movably carried in each of said duct exit portions to extract energy from the angular momentum of airflow passing through said duct from said inlet;
   a swept airfoil wing having a variable angle of attack operably mounted on said duct at said inlet bellmouth chamber;
   a diffuser augmenter secured to said duct encircling said exit or exhaust end of said duct in fixed spaced apart relationship thereto;
   said elongated duct is provided with an upper, inner surface of marked reflex curvature in side elevational view wherein general airflow is conducted along a substantially sinusoidal path between said inlet and said exit whereby said circular duct portions characterized as enclosing a pair of concentrated, counter-rotating regions of high angular airflow momentum derived from the linear airflow momentum;
   said elongated duct bifurcated mid-section includes curved inner wall surfaces constituting an angular airflow momentum guide, a vorticity augmenter and an angular modulator; and
   said diffuser augmenter includes a flared outlet in fixed space relationship to said elongated duct outlet effective to lower the pressure across the aft facing area of said duct exit and which augments the airflow gradients through said upper, inner surface of marked reflex curvature.

2. The invention as defined in claim 1 wherein:
said airfoil is a wing having a swept leading edge and having an apex forward of said inlet bellmouth chamber and a trailing edge span substantially lying across the entrance to said inlet bellmouth chamber immediately ahead of said marked reflex curvature.

3. The invention as defined in claim 2 including:
means rotatably supporting said elongated duct including means for laterally positioning said duct to orient said inlet bellmouth chamber in response to wind direction changes.

4. The invention as defined in claim 3 including:
a keel secured to said duct having an arm outwardly cantilevered ahead of said inlet bellmouth chamber;
said airfoil movably carried on the free end of said cantilevered arm to vary the angle of attack with respect to approaching wind; and
means operably coupled between said airfoil and said arm for moving said airfoil with respect to said inlet bellmouth chamber.

5. The invention as defined in claim 1 wherein:
said elongated duct is of reflexed configuration in side elevational view with said bellmouth chamber constituting an entrance leading into said bifurcated mid-section defining a combined and unitized angular momentum generator, vorticity augmenter and an angular momentum modulator converting the linear momentum of the wind energy into a pair of adjacent, parallel counter-rotating regions of high energy angular swirling momentum serving as the prime moving force for said propellor means.

6. The invention as defined in claim 5 including:
an ejector-diffuser augmenter fixedly carried externally on said exit or exhaust end of said elongated duct whereby combining the concept of vortex augmentation with diffuser augmentation is coupled by said angular momentum modulation duct.

* * * * *